United States Patent [19]

Kimura et al.

[11] Patent Number: 5,704,457
[45] Date of Patent: Jan. 6, 1998

[54] PARKING SYSTEM FOR A VEHICLE

[75] Inventors: Kiyoshi Kimura; Makoto Kojima; Shoji Tokushima; Nobuo Takemasa; Masahiro Imamura; Tsutomu Suzuki, all of Wako, Japan

[73] Assignee: Honda Giken Kogyo Kabushiki Kaisha, Tokyo, Japan

[21] Appl. No.: 603,318

[22] Filed: Feb. 20, 1996

[30] Foreign Application Priority Data

Feb. 20, 1995 [JP] Japan .................. 7-030386
Feb. 20, 1995 [JP] Japan .................. 7-030387
Feb. 20, 1995 [JP] Japan .................. 7-030388

[51] Int. Cl.[6] ........................... B60K 41/26
[52] U.S. Cl. .................. 192/4 A; 192/9; 477/10
[58] Field of Search ............ 477/10; 192/4 A, 192/9, 4 R, 30 W; 74/575, 577 M, 577 R

[56] References Cited

U.S. PATENT DOCUMENTS 3,270,840  9/1966  DeClaire .................... 192/4 A
3,703,941  11/1972 Ohie et al. ................. 192/4 A
4,892,014  1/1990  Morell et al. .............. 192/4 A
5,180,038  1/1993  Arnold et al. ............. 192/4 A
5,203,616  4/1993  Johnson .................... 192/4 R
5,542,513  8/1996  Reyes ....................... 192/9

FOREIGN PATENT DOCUMENTS 2-212246  8/1990  Japan .

*Primary Examiner*—Charles A. Marmor
*Assistant Examiner*—Sherry Lynn Estremsky
*Attorney, Agent, or Firm*—Nikaido Marmelstein Murray & Oram LLP

[57] ABSTRACT

A driving force from a motor is transmitted through a pinion, a first gear, a second gear, a third gear, a link, a control lever, a control shaft, a parking shaft and a parking lever to a parking pole. A lost motion spring is mounted between the control shaft and the parking lever for biasing the parking pole toward a parking gear. A one-way clutch is mounted between the third gear and a housing. The one-way clutch permits the driving force from the motor to be transmitted to the parking pole and prevents the resilient force of the lost motion spring from being transmitted back to the motor.

11 Claims, 10 Drawing Sheets

PARKING SYSTEM FOR A VEHICLE

BACKGROUND OF THE INVENTION

1. Field of the Invention

The present invention relates to a parking system for a vehicle, including a lock device for locking the rotation of wheels. The lock device is activated and deactivated by a driving force from a motor.

2. Description of Related Prior Art

A vehicle using an internal combustion engine as a driving source and having an automatic transmission includes a torque converter in a power transmitting path. Therefore, such a vehicle has a problem because the engine and driven wheels cannot be connected without slipping when the vehicle is stopped. For this reason, the rotation of the driven wheels cannot be locked by internal friction of the engine. An electric vehicle using a motor as a driving source also has a problem that the rotation of the driven wheels cannot be locked when the vehicle is stopped, because the motor does not have internal friction as large as that of an internal combustion engine. Therefore, such a vehicle is equipped with a parking system for locking the rotation of the driven wheels by bringing a parking pole into engagement with a parking gear provided on an output shaft of a transmission.

When a claw of the parking pole is brought into engagement into one of the spaces between the teeth of the parking gear to activate a lock means, the claw of the parking pole may not be completely engaged into the space between the teeth of the parking gear depending upon the phase of the parking gear. Rather, the claw may abut against a tooth crest between the tooth spaces. In such a case, if the parking pole is previously biased toward the parking gear by a resilient force from a lost motion spring, the claw of the parking pole can be automatically brought into engagement into one of the spaces between the teeth of the parking gear to activate the lock means, when the driven wheels are slightly moved to slightly rotate the parking gear (see Japanese Patent Application Laid-open No. 212246/90).

In a parking system designed so that the claw of the parking pole is brought into engagement into one of the spaces between the teeth by a driving force from the motor, when the claw is not in complete engagement in one of the spaces between the teeth of the parking gear, the resilient force of the lost motion spring is transmitted back to the motor in the form of a dislocating force applied to the lock means. For this reason, it is necessary to energize the motor to generate a load opposing the dislocating force, so that the lock means is not deactivated by the dislocating force. However, if the load opposing the dislocating force is generated in the motor, the motor generates unnecessary electric energy and the durability of the motor is adversely influenced.

In a vehicle designed so that a parking range is selected by a select lever to operate a parking system, a driver of the vehicle is informed of the operation of the parking system by a selected position lamp which is lit depending upon the position of the select lever. In this case, in a conventional mechanical parking system, if the parking range is selected by the select lever, the operation of the parking system can be insured. However, in an electric parking system which is operated by a driving force from the motor, even if the parking range is selected by the select lever (select switch), the operation of the parking system may not be insured in some cases due to a problem in the motor driving system or the like.

Further, in the conventional mechanism parking system, if the parking range is not selected by the select lever, it can be ensured that the parking system is in its deactivated state. However, in the electric parking system operated by the driving force from the motor, even if the parking range is not selected by the select lever (select switch), the parking system may be in its activated state in some cases due to a problem in the motor driving system or the like.

SUMMARY OF THE INVENTION

Accordingly, it is a first object of the present invention to eliminate a transmission of the dislocating force, due to the lost motion spring, back to the motor in a parking system designed so that the lock means is activated by the motor.

It is a second object of the present invention to reliably inform a driver of a failure in the operation of a parking system which is operated by a motor used as a driving source.

To achieve the first object, according to the present invention, there is provided a parking system for a vehicle, including a parking command device for outputting a parking command. A lock device locks a rotation of a wheel by bringing a parking pole into engagement with a parking gear when the parking command device outputs the parking command. The parking system further includes a motor device control device to start driving a motor when the parking command device outputs the parking commend. A driving force transmitting device transmits a driving force from the motor to activate the lock device. A lost motion device, incorporated in the driving force transmitting device, resiliently biases the lock device in an activating direction. A one-way device, incorporated in the driving force transmitting device between the motor and the lost motion device, permits the driving force from the motor to be transmitted to the lock device and restrains a repulsion force of the lost motion device from being transmitted back to the motor. A lock activation completion confirming device confirms the completion of the activation of the lock device. A motor stoppage control device stops the driving of the motor when the lock activation completion confirming device confirms the completion of the activation of the lock device.

With the above arrangement, the lock device can be activated by the driving force from the motor only by outputting the parking command by the parking command device. Therefore, the driver's operating force can be alleviated since the select switch does not activate or deactivate the lock device. Thus, a higher degree of freedom in design and layout than that of a conventional select bar can be used as the parking command device. In addition, a dislocating force of the lost motion device is prevented, by the one-way device, from being transmitted back to the motor. Therefore, it is unnecessary to cause the motor to generate a load opposing the dislocating force, leading to an energy saving and an enhanced duration of the motor. Moreover, the deactivation of the lock device by a load transmitted from the wheels is prevented by the one-way device, which results in substantially enhanced reliability.

The driving force transmitting device may include a control shaft which is driven for rotation by the driving force of the motor, and a parking lever supported on the control shaft to cam-engage the parking pole. The lock activation completion confirming device may detect a rotational angle of the control shaft. With this feature, the lock activation completion confirming device can be disposed at a location extremely near the parking pole. Thus, the completion of the activation of the lock device can be reliably detected without being influenced by looseness of various portions of the driving force transmitting device to accurately control the driving and stopping of the motor.

The parking system may include a vehicle speed detecting device for detecting a vehicle speed, and a parking operation prohibiting device for cutting off the supply of electric power to the motor, when the vehicle speed detecting device detects a vehicle speed equal to or higher than a predetermined value, and the parking command device outputs the parking command. With the above feature, even if the parking command is delivered when the vehicle speed is equal to or higher than the predetermined value, the supply of electric power to the motor is cut off and hence, the lock device is prevented from being activated during traveling of the vehicle which generates an abnormal sound.

To achieve the second object, according to the present invention, there is provided a parking system for a vehicle, including a parking command device for outputting a parking command. A lock device locks a rotation of a wheel. A motor drive control means starts driving a motor to activate the lock device when the parking command device outputs the parking command. A lock activation completion confirming device confirms the completion of the activation of the lock device. A motor stoppage control device stops the driving of the motor when the lock activation completion confirming device confirms the completion of the activation of the lock device. The parking system further includes a lock activated-state confirming device for confirming the activated state of the lock device after driving of the motor is stopped by the motor stoppage control device. A warning device warns a driver when the activated state of the lock device is not confirmed by the lock activated-state confirming device.

With the above arrangement, if the lock activated-state confirming device cannot confirm the activated state of the lock device when the locking operating completion confirming device confirms the completion of the activation of the lock device and the motor stoppage control device stops the driving of the motor, a warning is provided to the driver by the warning device and hence, the driver is alerted to use a hand brake.

If the warning device uses, as a power source, an exclusive battery separate from a battery for the motor, the warning device can be operated even if the battery of the motor has failed.

Further, to achieve the second object, according to the present invention, there is provided a parking system for a vehicle, including a command device for selectively outputting a parking command and a parking releasing command. A lock device locks a rotation of a wheel. A motor drive control device starts driving a motor to deactivate the lock means when the command device outputs the parking releasing command. A lock deactivation completion confirming device confirms the completion of the deactivation of the lock device. A motor stoppage control device stops the driving of the motor when the lock deactivation completion confirming device confirms the completion of the deactivation of the lock device. The parking system further includes a lock deactivated-state confirming device for confirming the deactivated state of the lock device after the driving of the motor is stopped by the motor stoppage control device. A warning device warns a driver when the deactivated state of the lock device is not confirmed by the lock deactivated-state confirming device.

With the above arrangement, if the lock deactivated-state confirming device cannot confirm the deactivated state of the lock device when the lock deactivated-state confirming device confirms the completion of the deactivation of the lock device and the motor stoppage control device stops the driving of the motor, the warning can be provided to the driver by the warning device to inform the driver of an abnormality.

The warning device may use, as a power source, an exclusive battery separate from a battery for the motor. Thus, the warning device can be operated even if the battery of the motor has failed.

The parking system may include a manual deactivating device capable of manually deactivating the lock device when the warning device is operated. Thus, when the deactivated state of the lock device cannot be confirmed, the lock device can be deactivated by the manual deactivating device.

The parking system may include an interference preventing device for preventing the driving force of the motor and a driving force of the manual deactivating device from interfering with each other. Thus, the lock device can be reliably activated and deactivated, because the mutual interference between the driving force of the motor and the driving force of the manual deactivating device is prevented by the interference preventing device.

The parking system may include a motor drive prohibiting device for cutting off the supply of electric power to the motor when the manual lock deactivating device is operated. Thus, the driving force of the motor is prevented from interfering with the driving force of the manual deactivating device, because if the manual deactivating device is operated, the supply of electric power to the motor is cut off by the motor drive prohibiting device.

The above and other objects, features and advantages of the invention will become apparent from the following description of preferred embodiments taken in conjunction with the accompanying drawings.

DESCRIPTION OF THE PREFERRED EMBODIMENTS

A first embodiment of the present invention will now be described with reference to FIGS. 1 to 9.

Figure 1:
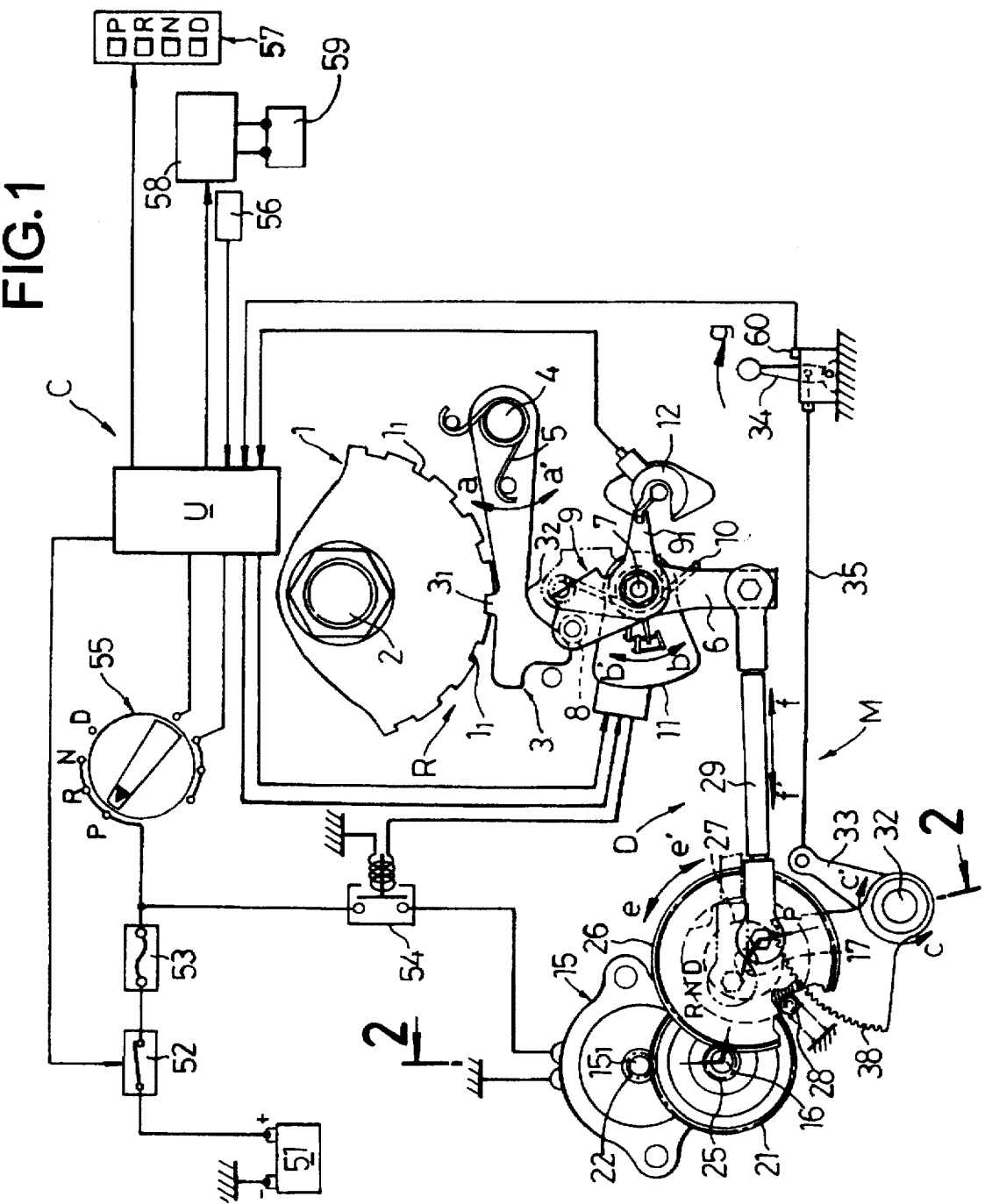
FIG. 1 is a diagrammatic illustration of the entire arrangement of a parking system according to a first embodiment of the present invention.

Referring to FIG. 1, a parking gear 1 is provided around its outer periphery with a large number of spaces $1_1$ between its teeth. The parking gear 1 is fixed to an output shaft 2 of a transmission of a vehicle. A parking pole 3 is swingably supported by a pin 4 and has a claw $3_1$ which can engage into one of the spaces $1_1$ in the parking gear 1, and a cam surface $3_2$ which can abut against a roller 8 which will be described hereinafter. The parking pole 3 is biased in a direction of an arrow a' by a return spring 5. Thus, the claw $3_1$ is biased in a direction away from the space $1_1$ in the parking gear 1. The parking gear 1 and the parking pole 3 constitute a lock means R.

A control shaft 7 is rotatably supported and is integrally provided with a control lever 6. A parking lever 9, having the roller 8, is relatively rotatably supported on the control shaft 7. A lost motion spring 10 is wound around the control shaft 7 and is locked at its opposite ends to the control shaft 7 and the parking lever 9. Thus, the roller 8 is brought into pressure contact with a cam surface $3_2$ of the parking pole 3 by biasing the parking lever 9 in a direction of an arrow b relative to the control shaft 7 by a resilient force of the lost motion spring 10.

A rotational position of the control shaft 7 integral with the control lever 6 is detected by a limit switch 11. A rotational position of the parking lever 9 is detected by a stroke sensor 12 which includes a potentiometer connected to an arm $9_1$ integral with the parking lever 9. In this way, by disposing the limit switch 11 and the stroke sensor 12 at locations near the lock means R, the activated state of the lock means R can be reliably detected without being influenced by looseness of various portions. Thus, it is possible to control the driving and stopping of the motor 15 (which will be described hereinafter) with an accurate timing, and to reliably detect a problem.

Figure 2:
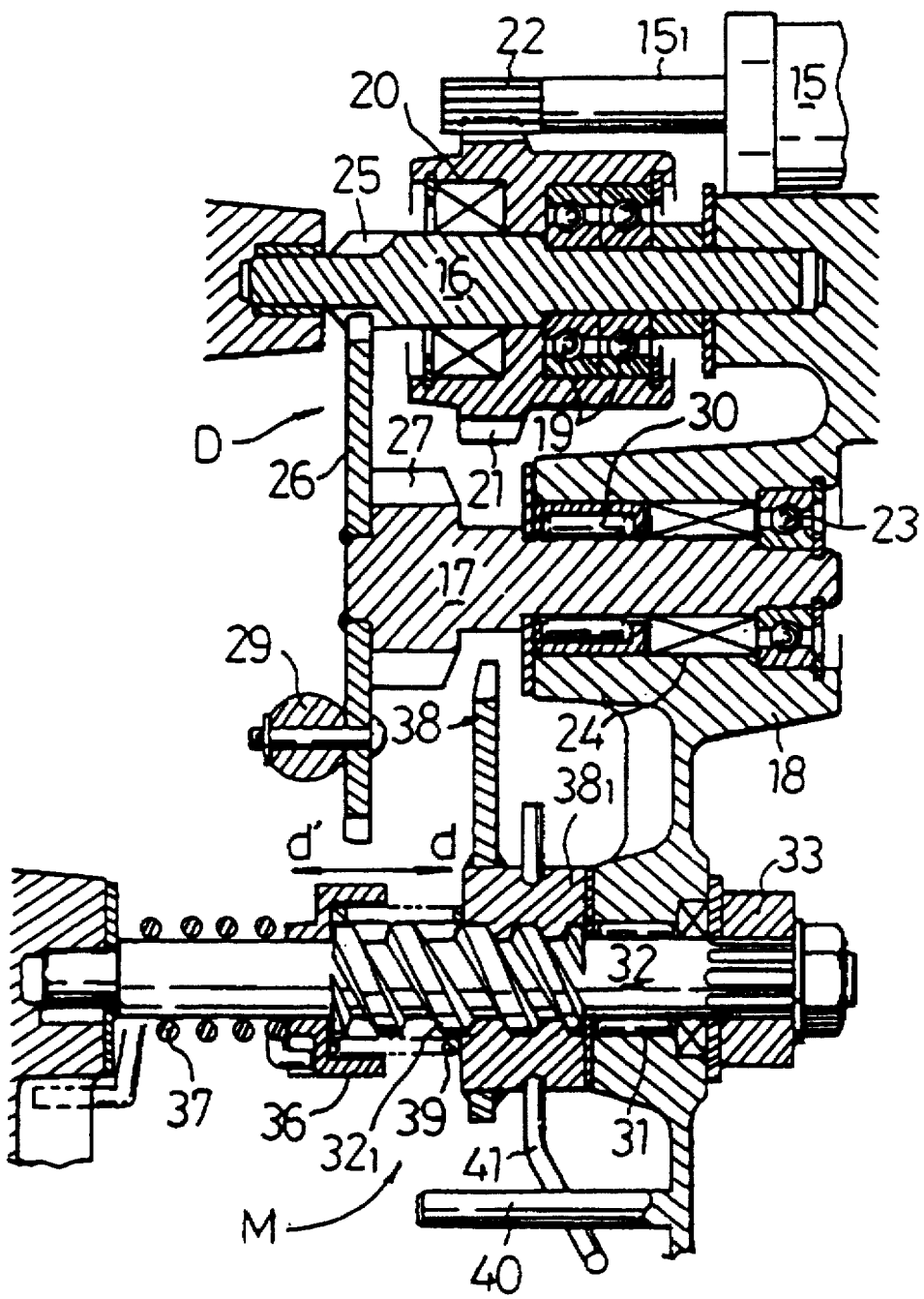
FIG. 2 is an enlarged sectional view taken along a line 2—2 in FIG. 1.

As can be seen from FIGS. 1 and 2, an intermediate shaft 16 and an output shaft 17 parallel to the rotary shaft $15_1$ of the motor 15 are rotatably supported in a housing 18. The rotating direction of the motor 15 is set in one direction, which simplifies the wiring.

A first gear 21 is carried on the intermediate shaft 16 through ball bearings 19, 19 and a first one-way clutch 20. A pinion 22 is provided on the rotary shaft $15_1$ of the motor 15 and meshed with the first gear 21. The output shaft 17 is supported in the housing 18 through a ball bearing 23, a needle bearing 30 and a second one-way clutch 24. The output shaft 17 is also provided with a manually driven gear 27, and a third gear 26 which is meshed with a second gear 25 provided on the intermediate shaft 16. A detent mechanism 28, including a ball and a spring, is mounted in order to locate the third gear 26 at two rotational positions different in phase by 180° from each other. The third gear 26 and the control lever 6 are interconnected by a link 29.

The motor 15 and the lock means R can be sufficiently spaced apart from each other by using the link 29, which increases a degree of freedom in placement of the motor. Therefore, the motor 15 can be placed at a high position which is spaced apart from a road surface, i.e., at an environmentally convenient position, leading to enhanced reliability and durability.

The pinion 22, the first gear 21, the first one-way clutch 20, the intermediate shaft 16, the second gear 25, the third gear 26, the output shaft 17, the second one-way clutch 24, the link 29, the control lever 6, the control shaft 7 and the parking lever 9 constitute a driving-force transmitting means D for transmitting a driving force from the motor 15 to the lock means R.

The structure of a manual operating device M will be described below. A manual control shaft 32 is rotatably supported in the housing 18 with a needle bearing 31 interposed therebetween. A manual control arm 33 is provided on the manual control shaft 32 and connected through Bowden wire 35 to a manual lever 34 which is mounted within a passenger compartment. A return spring 37 is mounted between the housing 18 and a collar 36 which is fixed to the manual control shaft 32, so that the manual control shaft 32 is biased in a direction of an arrow c, i.e., in a rotating direction against a tension of the Bowden wire 35 by a resilient force of the return spring 37.

A boss portion $38_1$ of a manual drive gear 38 is threadedly engaged with a quick threaded portion $32_1$ which is formed on an outer periphery of the manual control shaft 32. The manual drive gear 38 is biased in a direction of an arrow d by a return spring 39 which is compressed between the manual drive gear 38 and the collar 36. In addition, a rotation limiting force is applied to the manual drive gear 38 by a friction spring 41 which is locked to an anchor pin 40 projectingly provided on the housing 18 to come into a resiliently sliding contact with an outer periphery of the boss portion $38_1$. Usually, the manual drive gear 38 biased in the direction of the arrow d by the resilient force of the return spring 39 is in a state in which the meshing with the manual driven gear 27 has been released. The manual drive gear 38 is formed into a sector shape, such that when the manual drive gear 38 has been meshed with the manual driven gear 27, the gear 38 drives the manual driven gear 27 to rotate through 180°.

Figure 3:
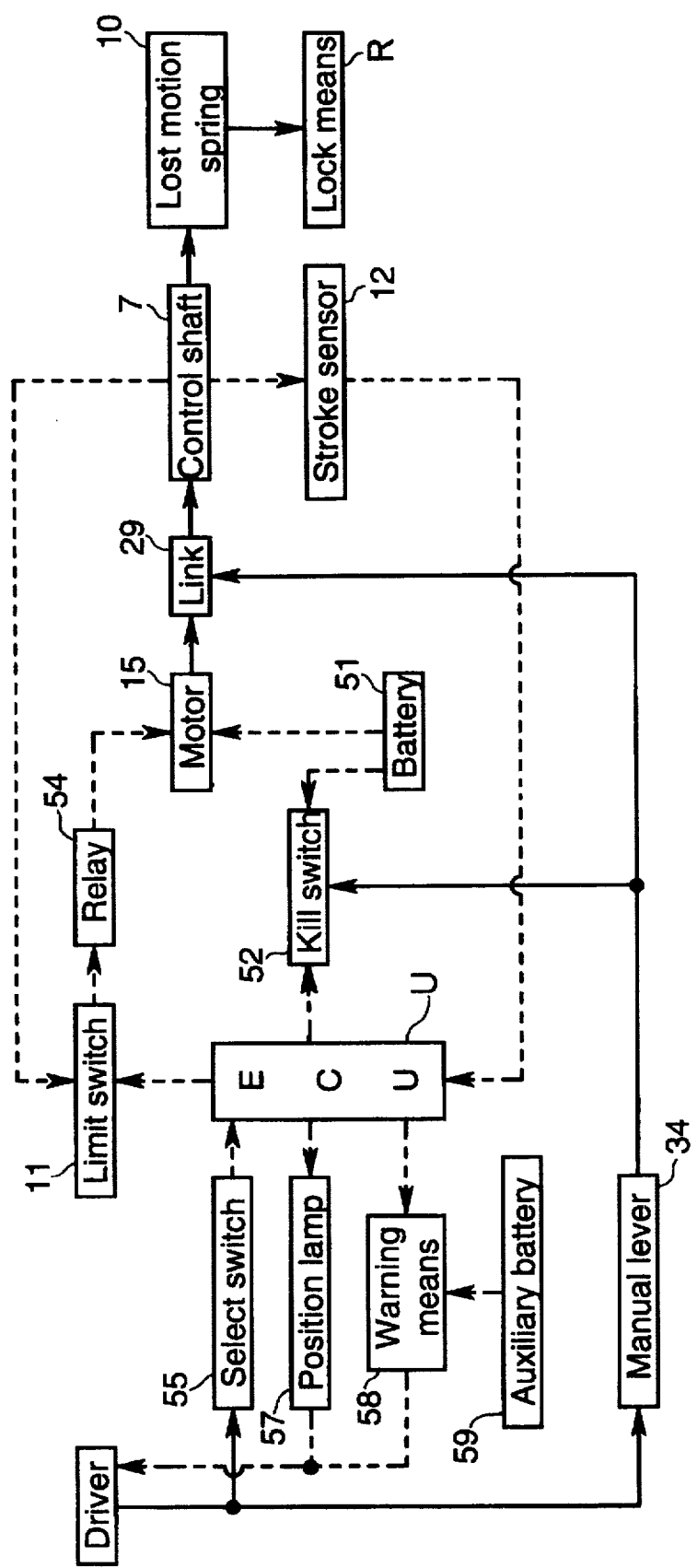
FIG. 3 is a block diagram of a control system.
Figure 4:
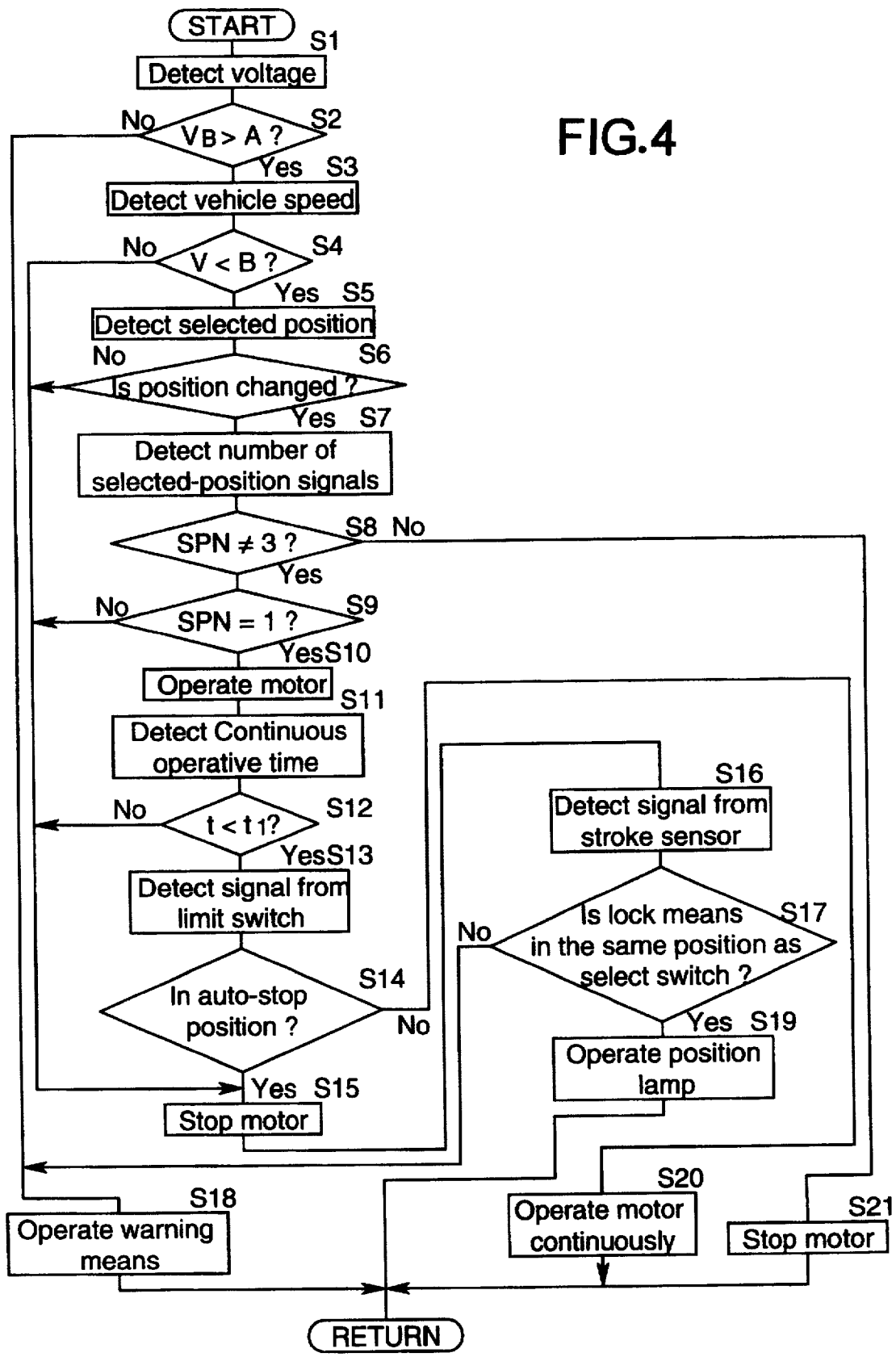
FIG. 4 is a flow chart for explaining the operation.

The structure of a control system C will be described below with reference to FIGS. 1, 3 and 4.

A kill switch or emergency stop switch 52, a fuse 53 and a relay 54 are interposed in series between a battery 51 of 12V and the motor 15. The relay 54 is connected to and operated by the limit switch 11.

A selector switch 55 is mounted within the passenger compartment and capable of selecting any of a "D" range (a drive range), an "N" range (a neutral range), an "R" range (a reverse range) and a "P" range (a parking range). In addition to a position signal from the select switch 55, a signal from the stroke sensor 12, a signal from a vehicle speed sensor 56 and a signal from a manual lever operation detecting sensor 60 mounted on the manual lever 34 are input to an electronic control unit U. In addition to the limit switch 11 and the kill switch 52, a selected position lamp means 57 for indicating a selected position and a warning or alarm means 58 having an exclusive battery 59, separate from the battery 51, are connected to the electronic control unit U.

The operation of the embodiment of the present invention having the above-described arrangement will be described below with reference to the flow chart shown in FIG. 4.

First, a voltage $V_B$ of the battery 51 is detected at step S1. If the voltage $V_B$ of the battery 51 is equal to or lower than a predetermined reference value A (e.g., 0 to 3V) at step S2, the warning device 58 is operated to warn a driver of the vehicle at step S18. If the voltage $V_B$ of the battery 51 exceeds the reference value A at step S2, a vehicle speed V is detected by the vehicle speed sensor 56 at step S3. If the vehicle speed V is equal to or higher than a reference value B (e.g., 4 to 5 km/hr) at step S4, the driving of the motor 15 is stopped at step S15. Thus, the operation of the lock means R during traveling of a vehicle can be prevented, and the generation of an abnormal sound due to slipping between the parking gear 1 and the parking pole 3 can be avoided.

If the vehicle speed V is smaller than the reference value B at step S4, the position of the select switch 55 is detected at step S5. There are two types of position signals output from the select switch 55. One is a signal corresponding to the "D" range, the "N" range or the "R" range, and the other is a signal corresponding to the "P" range. If the current signal and the last signal are identical to each other at step S6, the driving of the motor 15 is stopped at step S15.

If the current signal and the last signal are different from each other at step S6, the number SPN of position signals from the select switch 55 is detected at step S7. SPN=0 means a state in which a wire is cut; SPN=1 means a normality; SPN=2 means a state in which a halfway of the wire is cut or gears are caught with each other; and SPN=3 means a halfway of the driving-force transmitting device is stopped. If SPN=3 (halfway stop) at step S8, the driving of the motor 15 is stopped at step S21. If SPN=0 (the wire is cut) or 2 (a halfway of the wire is cut or gears are caught) at step S9, the driving of the motor 15 is stopped at step S15.

If SPN=1 (normality) at step S9, the motor 15 is driven. Namely, if the position signal is changed from the "D" range, the "N" range or the "R" range to the "P" range, the lock means R is driven from a deactivated state to an activated state. Reversely, if the position signal is changed from the "P" range to the "D" range, the "N" range or the "R" range, the lock means R is driven from the activated state to the deactivated state.

A time t lapsed from the start of the motor 15 is counted at step S11. If the time t is equal to or larger than a reference value $t_1$ (e.g., 2 to 3 seconds) at step S12, i.e., if the motor 15 is not stopped due to any problem and remains in a continuously operated state, the driving of the motor 15 is stopped at step S15.

If the time t is smaller than the reference value $t_1$ at step S12, a signal from the limit switch 11, which is connected to the control shaft 7, is detected at step S13. If the limit switch 11 does not detect an auto-stop position of the control shaft 7 at its rotational end at step S14, the driving of the motor 15 is continued at step S20. At the time when the limit switch 11 detects the auto-stop position of the control shaft 7 at its rotational end at step S14, the driving of the motor 15 is stopped at step S15.

A signal from the stroke sensor 12 connected to the arm $9_1$ of the parking lever 9 is detected at stop S16. The state of the lock means R detected from the signal from the stroke sensor 12 is compared with the position signal from the select switch 55 at step S17. If the position signal indicates the "D" range, the "N" range or the "R" range, while the position of the parking lever 9 indicates that the lock means R is in the activated state, or if the position signal indicates the "P" range, while the position of the parking lever 9 indicates that the lock means R is in the deactivated state, the alarm or warning device 58 is operated at step S18. On the other hand, if the state of the lock device R coincides with the position signal, a predetermined lamp of the select position lamp device 57 is lit at step S19.

The above-described operation will be described below in more detail. When the select switch 55 is in the "D" range, the "N" range or the "R" range, the lock device R is in the deactivated state and the claw $3_1$ of the parking pole 3, which is biased in the direction of the arrow a' by the resilient force of the return spring 5, is out of engagement with the space $1_1$. At this time, the relay 54 is in a closed state. When the select switch 55 is operated into the "P" range to operate the lock means R, the motor 15 is started. The rotation of the motor 15 is transmitted through the pinion 22, the first gear 21, the first one-way clutch 20 and the second gear 25. At this time, the first one-way clutch 20 is locked to transmit the rotation of the first gear 21, and the second one-way clutch 24 is slipped to permit the rotation of the third gear 26.

The rotation of the third gear 26 causes the link 29 to be moved in a direction of an arrow f, thereby rotating the control lever 6 in the direction of the arrow b along with the control shaft 7. When the control shaft 7 is rotated, the parking lever 9 is rotated in the direction of the arrow b through the lost motion spring 10, and the parking pole 3 has the cam surface $3_2$ urged against the roller 8 of the parking lever 9 so that the parking pole 3 is rotated in the direction of the arrow a. Thus, the claw $3_1$ is brought into engagement into one of the spaces $1_1$. This limits the rotation of the parking gear 1, as shown in FIG. 1, thereby bringing the lock means R into the deactivated state.

If the claw $3_1$ of the parking pole 3 is not engaged into one of the spaces $1_1$ due to the phase of the parking gear 1, the rotation of the parking lever 9 is stopped halfway, and only the control shaft 7 is rotated by resilient deformation of the lost motion spring 10. When the vehicle is then slightly moved to rotate the parking gear 1, the claw $3_1$ of the parking pole 3 is urged against the parking lever 9 which is biased by the resilient force of the lost motion spring 10. The claw $3_1$ is then brought into engagement into one of the spaces $1_1$ to bring the lock means R into the activated state.

When the select switch 55 is in the "P" range, the lock means R is in the activated state shown in FIG. 1, and the claw $3_1$ of the parking pole 3, biased in the direction of the arrow a by the resilient force of the lost motion spring 10, is in engagement in one of the spaces $1_1$. When the select switch 55 is operated into the "D" range, the "N" range or the "R" range to deactivate the lock means R from the just described condition, the motor 15 starts to rotate the third gear 26 in a direction of an arrow e, thereby causing the link 29 to be moved in a direction of an arrow f'. As a result, the control shaft 7 and the parking lever 9 are rotated in a direction of an arrow b', and the parking pole 3 is rotated in the direction of the arrow a' by the resilient force of the return spring 5, so that the claw $3_1$ is disengaged from the space $1_1$, thereby deactivating the lock device R.

When the lock means R is in the activated state and particularly, when the claw $3_1$ of the parking pole 3 is not in complete engagement in one of the spaces $1_1$ in the parking gear 1 and the lost motion spring 10 generates the resilient force, the resilient force of the lost motion spring 10 serves as a force for releasing the engagement between the claw $3_1$ and the space $1_1$. The force tries to push the link 29 in the direction of the arrow f', which thereby rotates the third gear 26 to which the link 29 is connected, in the direction of the arrow e'. However, the second one-way clutch 24 interposed between the output shaft 17 integral with the third gear 26 and the housing 18 is locked, thereby causing the releasing force to be transmitted to and received by the housing 18. Thus, the resilient force (i.e., the releasing force) of the lost motion spring 10 is prevented from being transmitted back to the motor 15. Hence, it is unnecessary for the motor to exhibit a torque opposing the releasing force, thereby enabling an energy saving and an enhancement in durability of the motor.

The second one-way clutch 24 also has a function as described below. In the prior art, a detent mechanism is provided on the select lever in order to prevent the lock means from being brought out of engagement by gravity which tries to move the vehicle when the vehicle is parked on a slope or the like with the lock means R brought into the activated state. In this manner, friction of an operating system of the lock means R is increased to prevent the lock means R from being brought out of engagement. However, in the parking system in which the lock means R is activated and deactivated by the motor 15, there is a problem that the load of the motor 15 is increased by such friction. Therefore, if the disengagement of the lock means R is prevented by the second one-way clutch 24 as in this embodiment of the present invention, the lock means R can be reliably retained at the activated state without increasing the load on the motor 15, leading to an enhanced reliability of the motor.

When the lock device R is in the activated state, the rotational moment acting on the third gear 26 can be reduced by a dislocating force by stopping the left end of the link at a location slightly short of a top dead center. Thus, the load acting on the second one-way clutch 24 can be alleviated and hence, a small-sized clutch can be used as the second one-way clutch 24.

For example, if the motor 15 is broken and the lock means R is fixed at the activated position, the lock means R can be deactivated by pulling the manual lever 34 in a direction of an arrow g.

More specifically, when the manual control shaft 32 is rotated in a direction of an arrow c' through the Bowden wire 35 and the manual control arm 33 by pulling the manual lever 34 in the direction of the arrow g, the manual drive gear 38, to which a friction force is applied by the friction spring 41, can not easily rotate relative to the housing 18. Therefore, a relative rotation between the manual drive gear 38 and the manual control shaft 32 is produced by the rotation of the manual control shaft 32. As a result, the manual drive gear 38 is moved in a direction of an arrow d' and meshed with the manual driven gear 27, while compressing the return spring 39.

When the manual drive gear 38 is moved in the direction of the arrow d' to abut against an end face of the collar 36, the manual drive gear 38 is integrally united with the manual control shaft 32 and rotated in the direction of the arrow c'. As a result, the third gear 26 integral with the manual driven gear 27 is rotated through 180°, thereby deactivating the lock means R. At this time, the second one-way clutch 24 is slipped to permit the rotation of the third gear 26, while the first one-way clutch 20 is slipped to prevent the rotation of the third gear 26 from being transmitted back to the motor 15.

When the manual lever 34 is released after the deactivation of the lock means R, the manual control shaft 32 is rotated in the direction of the arrow c by the resilient force of the return spring 37, and the manual drive gear 38 with the friction force applied thereto by the friction spring 41 is moved in the direction of the arrow d by actions of the return spring 39 and the quick threaded portion $32_2$ and thus demeshed from the manual driven gear 27.

In a normal condition, the manual drive gear 38 and the manual driven gear 27 are not meshed with each other and hence, when the motor 15 is driven to activate or deactivate the lock means R, the driving force of the motor 15 cannot be transmitted to the manual lever 34. When the manual lever 34 is operated, the kill switch 52 is opened with an output from the manual operation detecting sensor 60, thereby prohibiting the driving of the motor 15 to prevent interference between the manual operation and the operation by the motor 15.

It is also possible to operate the lock means R from the deactivated state to the activated state by the manual lever 34.

As described above, the lock means R of the parking system can be activated and deactivated only by outputting an electric parking command. Therefore, the driver's operating force can be alleviated, as compared with the prior art parking system in which the lock means R is activated and deactivated by a conventional select lever. Moreover, a means for outputting the parking command can be constituted by the select switch 55. Therefore, the degree of freedom in design and layout can be substantially enhanced, as compared with the conventional select lever.

Various problems may arise in the parking system and methods for coping with these problems will be described below.

(1) When the parking system has been brought into a non-deactivatable state

Figure 5:
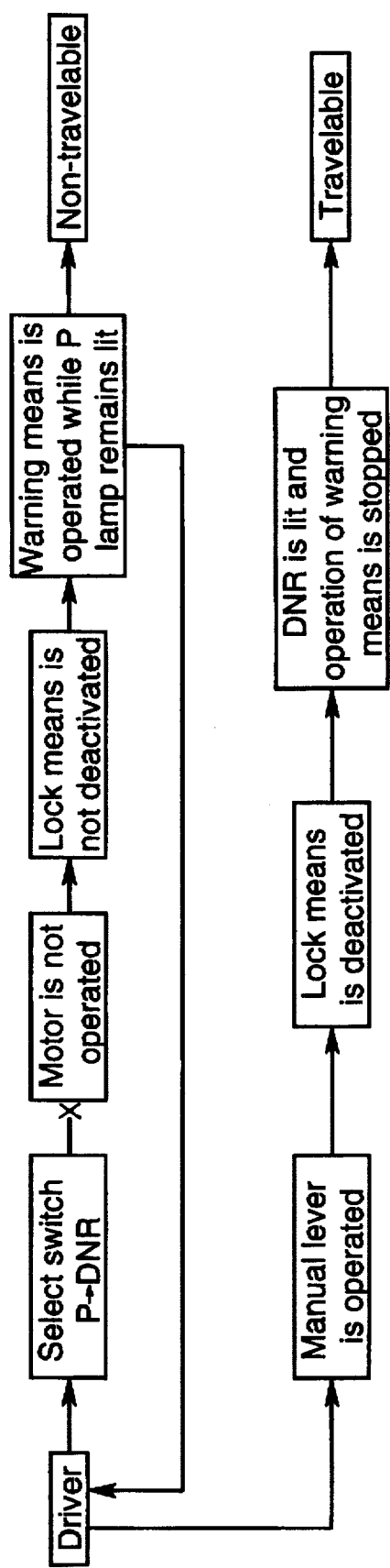
FIG. 5 is a diagram for explaining the operation when the parking system has fallen into a nondeactivatable state.

As shown in FIG. 5, if the motor 15, which should normally be operated when the driver operates the select switch 55 from the "P" range into the "D" range, the "N" range or the "R" range, cannot be operated for any reason, the lock means R is held in the activated state.

At that time, a "P" lamp of the selected position lamp means 57 remains lit, and the warning means 58 is operated to light an "operate manual lever" lamp.

When the driver is informed of the problem by the warning mean 58, the driver operates the manual lever 34. The lock means R is deactivated by the manual operating means M, and the "D" lamp, an "N" lamp or an "R" lamp corresponding to a newly selected position is lit. At the same time, the operation of the warning means 58 is stopped. Thus, the vehicle is brought into a travelable state.

(2) When the parking system has been brought into a non-activatable state

Figure 6:
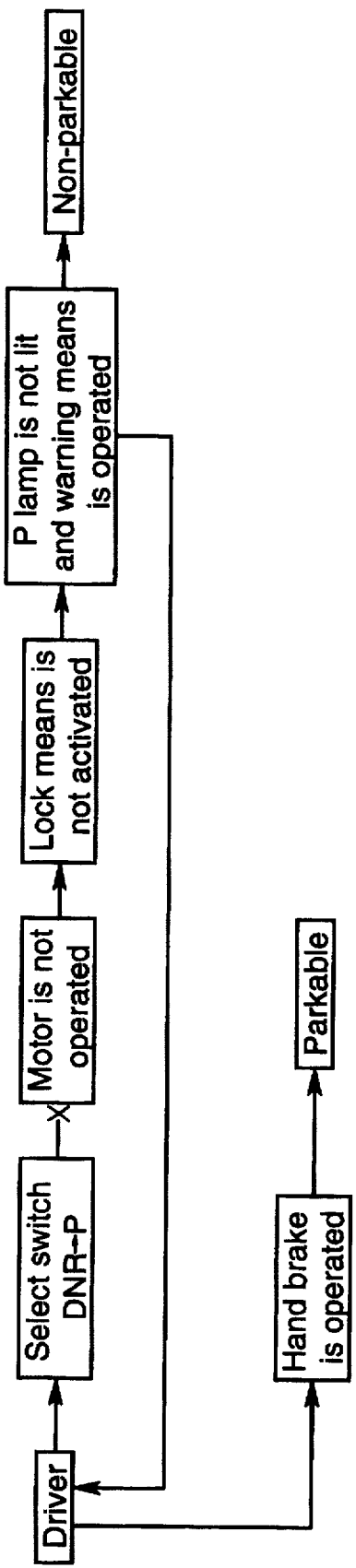
FIG. 6 is a diagram for explaining the operation when the parking system has fallen into a non-activatable state.

As shown in FIG. 6, if the motor 15, which should normally be operated when the driver operates the select switch 55 from the "D" range, the "N" range or the "R" range into the "P" range, cannot be operated for any reason, the lock means R is held in the deactivated state. At this time, the "P" lamp of the selected position lamp means 57 is not lit, and the warning means 58 is operated to light a "operate hand brake" lamp. As a result, the vehicle is brought into its parkable state by operating a hand brake by the driver who is informed of the problem by the warning means 58.

(3) When the parking system is spontaneously deactivated

Figure 7:
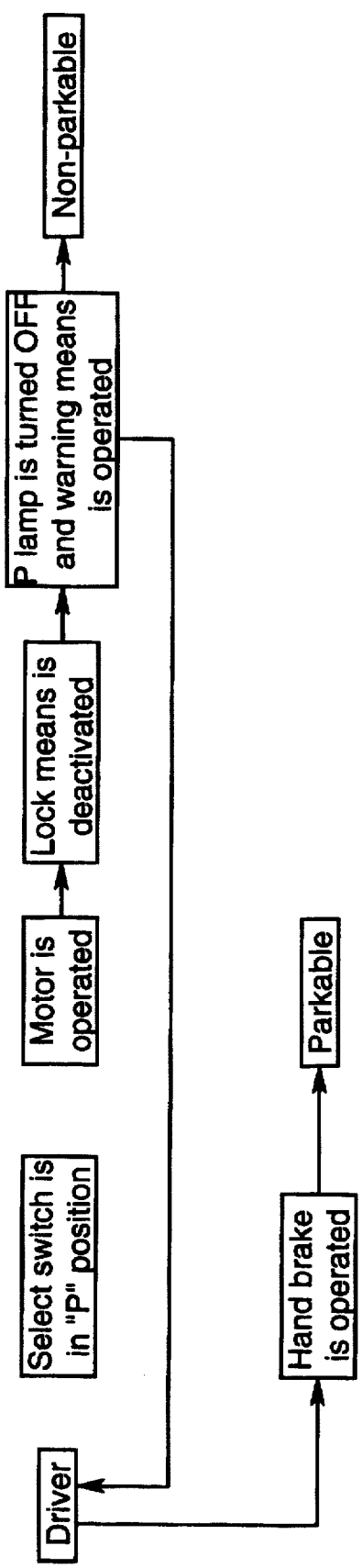
FIG. 7 is a diagram for explaining the operation when the parking system is spontaneously deactivated.

As shown in FIG. 7, if the motor 15 is arbitrarily operated for any reason to deactivate the lock means R, even though the driver does not operate the select switch 55 from the "P" range to the "D" range, the "N" range or the "R" range, the "P" lamp of the selected position lamp device 57 is lit. As a result, the vehicle is brought into its parkable state by operating the hand brake by the driver being informed of the problem by the warning means 58.

4) When the parking system is spontaneously activated

Figure 8:
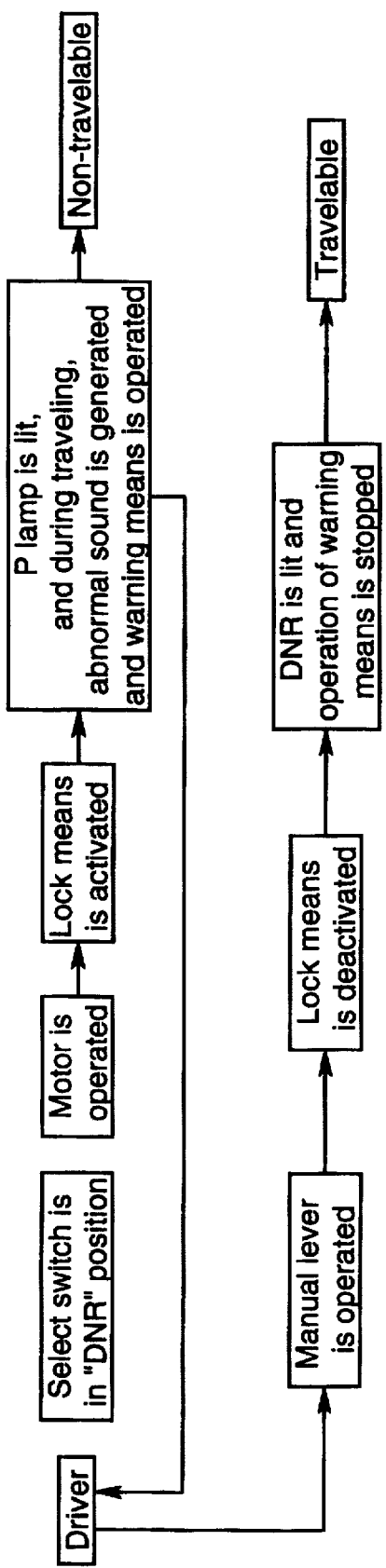
FIG. 8 is a diagram for explaining the operation when the parking system is spontaneously activated.

As shown in FIG. 8, if the motor 15 is arbitrarily operated for any reason to activate the lock means R, even though the driver does not operate the select switch 55 from the "D" range, the "N" range or the "R" range to the "P" range, the "P" lamp of the selected position lamp 57 is lit, and the warning device 58 is operated to light a "operate manual lever" lamp. Also, if the vehicle is traveling when the motor is arbitrarily operated (when the vehicle speed detected by the vehicle speed sensor 56 is equal to or lower than a speed of opening of the kill switch 52), the lock means R is slipped to generate an abnormal sound.

When the driver is informed of the problem by the warning device 58, the driver operates the manual lever 34. The lock means R is deactivated by the manual operating device M, and the "D" lamp, the "N" lamp or the "R" lamp corresponding to an intrinsically selected position is lit, while the operation of the warning device 58 is stopped. Thus, the vehicle is brought into its travelable state.

(5) When the operation of the parking system is continued and released

Figure 9:
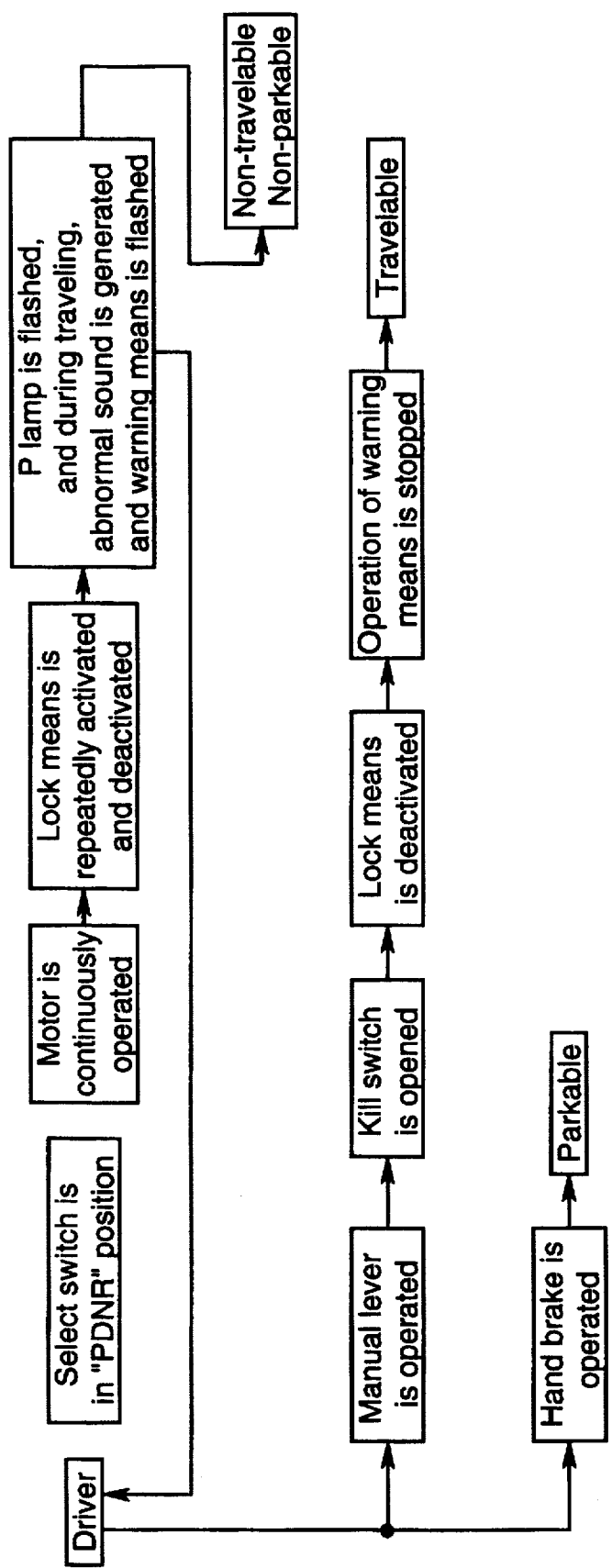
FIG. 9 is a diagram for explaining the operation when the activation and deactivation of the parking system are repeated.

As shown in FIG. 9, when the motor 15 is continuously rotated for any reason irrespective of the position of the select switch 55, the activation and deactivation of the lock means R are repeated. The "P" lamp is lit, while the lamp of the warning device 58 is lit. Further, when the vehicle is traveling, the lock device R is slipped to generate an abnormal sound.

When the driver is informed of the problem by the warning means 58, the driver operates the manual lever 34. The kill switch 52 is opened by the manual lever operation detecting means 60 and at the same time, the lock means R is deactivated by the manual operating device M. The operation of the warning device 58 is stopped, thereby bringing the vehicle into its travelable state. Alternatively, the vehicle is brought into its parkable state by operating the hand brake by the driver after being informed of the problem by the warning means 58.

A second embodiment of the present invention will now be described with reference to FIG. 10.

The second embodiment is designed to prevent the driving force from the motor 15 from interfering with the manual operating means M. The parking gear 1, the output shaft 2, the parking pole 3, the pin 4, the return spring 5, the control shaft 7, the roller 8, the parking lever 9, the manual lever 34 and the Bowden wire 35, which are shown in FIG. 10, are the same as those in the first embodiment. The control shaft 7 is reciprocally rotated by the motor 15 through the driving force transmitting device D.

A manual control arm 61 is relatively rotatably supported on the control shaft 7 and connected to the Bowden wire 35. The manual control arm 61 has two elongated hole $61_1$, $61_1$. Two projections $9_2$, $9_2$, provided on the parking lever 9, are loosely fitted in the elongated holes $61_1$, $61_1$, respectively.

Figure 10:
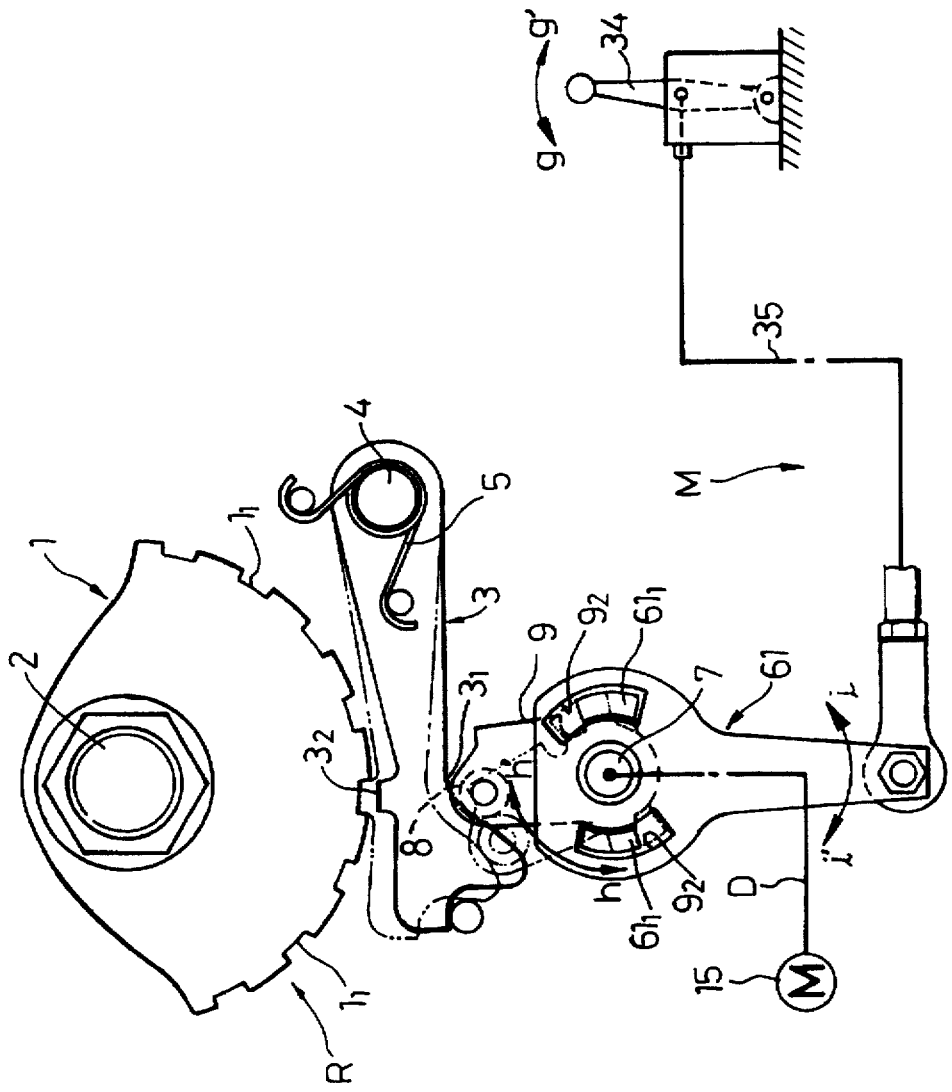
FIG. 10 is a diagrammatic illustration similar to FIG. 1, but showing a second embodiment of the present invention.

In FIG. 10, the parking lever 9 has been turned in a direction of an arrow h', and the lock means R has been deactivated. When the motor 15 is driven to turn the parking lever 9 in a direction of an arrow h in order to activate the lock means R from the just described condition, the driving force of the motor 15 cannot interfere with the manual operating means M by the movement of the projections $9_2$, $9_2$, within the elongated holes $61_1$, $61_1$. If the manual lever 34 is operated in a direction of an arrow g to turn the manual control arm 61 in a direction of an arrow i in order to activate the lock means R by the manual operating means M, the elongated holes $61_1$, $6_1$ abut against the projections $9_2$, $9_2$ in the course of such turning movement, so that the parking lever 9 can be turned in the direction of the arrow h.

Likewise, when the parking level 9 has been turned in the direction of the arrow h to activate the lock means R, even if the parking lever 9 is turned in the direction of the arrow h' by the motor 15 in order to deactivate the lock means R, the driving force of the motor 15 cannot interfere with the manual operating means M by the movement of the projections $9_2$, $9_2$ within the elongated holes $61_1$, $61_1$. If the manual lever 34 is operated in a direction of an arrow g' to turn the manual control arm 61 in a direction of an arrow i', the elongated holes $61_1$, $61_1$ abut against the projections $9_2$, $9_2$ in the course of such turning movement, so that the parking lever 9 can be turned in the direction of the arrow h'.

When the parking lever 9 has been turned by the manual lever 34, the driving force is intended to be transmitted back to the motor 15 through the driving force transmitting means M. However, the driving force cannot be transmitted back to the motor 15 by slipping of the first one-way clutch 20 incorporated in the driving force transmitting device D, as described above.

Although the embodiments of the present invention have been described in detail, it will be understood that the present invention is not limited to the above-described embodiments, and various modifications may be made without departing from the spirit and scope of the invention defined in claims.

For example, the parking system according to the present invention is not limited to the use in an electric vehicle, and is applicable to a vehicle having an internal combustion engine serving as a driving source.

What is claimed is:

1. A parking system for a vehicle comprising:

a parking command means for outputting a parking command;

a lock means for locking a rotation of a wheel of the vehicle by bringing a parking pole into engagement with a parking gear when the parking command means outputs the parking command;

a motor drive control means for starting a motor to drive when said parking command means outputs the parking command;

a driving force transmitting means for transmitting a driving force from the motor to activate said lock means;

a lost motion means, incorporated in said driving force transmitting means, for resiliently biasing said lock means in an activating direction;

a one-way means, incorporated in said driving force transmitting means between said motor and said lost motion means, for permitting the driving force from the motor to be transmitted to said lock means and for restraining a repulsion force of said lost motion means from being transmitted back to the motor;

a lock activation completion confirming means for confirming completion of activation of said lock means; and a motor stoppage control means for stopping the driving of the motor when said lock activation completion confirming means confirms the completion of the activation of said lock means, wherein said driving force transmitting means includes a control shaft which is driven for rotation by the driving force of the motor, and a parking lever, supported on said control shaft, to cam-engage said parking pole, and said lock activation completion confirming means detects a rotational angle of said control shaft.

2. A parking system for a vehicle according to claim 1, further including a vehicle speed detecting means for detecting a vehicle speed, and a parking operation prohibiting means for cutting off a supply of electric power to said motor, when said vehicle speed detecting means detects a vehicle speed equal to or higher than a predetermined value and said parking command means outputs the parking command.

3. A parking system according to claim 2, wherein said parking operation prohibiting means is a kill switch.

4. A parking system for a vehicle comprising:

a parking command means for outputting a parking command;

a lock means for locking a rotation of a wheel;

a motor drive control means for starting a motor to drive to activate said lock means when said parking command means outputs the parking command;

a lock activation completion confirming means for confirming completion of activation of said lock means;

a motor stoppage control means for stopping driving of the motor when said lock activation completion confirming means confirms the completion of the activation of said lock means;

a lock activated-state confirming means for confirming an activated state of said lock means after driving of the motor is stopped by said motor stoppage control means; and a warning means for warning a driver of the vehicle when the activated state of said lock means is not confirmed by said lock activated-state confirming means.

5. A parking system for a vehicle according to claim 4, wherein said warning means uses, as a power source, an exclusive battery separate from a battery for said motor.

6. A parking system for a vehicle, comprising:

a command means for selectively outputting a parking command and a parking releasing command;

a lock means for locking a rotation of a wheel;

a motor drive control means for starting a motor to drive to deactivate said lock means when said command means outputs the parking releasing command;

a lock deactivation completion confirming means for confirming completion of deactivation of said lock means;

a motor stoppage control means for stopping driving of said motor when said lock deactivation completion confirming means confirms the completion of the deactivation of said lock means;

a lock deactivated-state confirming means for confirming a deactivated state of said lock means after driving of the motor is stopped by said motor stoppage control means; and a warning means for warning a driver of the vehicle when the deactivated state of said lock means is not confirmed by said lock deactivated-state confirming means.

7. A parking system for a vehicle according to claim 6, wherein said warning means uses, as a power source, an exclusive battery separate from a battery for the motor.

8. A parking system for a vehicle according to claim 6, further including a manual lock-deactivating means for manually deactivating the lock means when said warning means is operated.

9. A parking system for a vehicle according to claim 8, further including an interference preventing means for preventing the driving force of said motor and a driving force of said manual deactivating means from interfering with each other.

10. A parking system according to claim 9, wherein said interference preventing means includes holes provided on a manual control lever and projections provided on a parking lever.

11. A parking system for a vehicle according to claim 8, further including a motor drive prohibiting means for cutting off a supply of electric power to the motor when said manual lock deactivating means is operated.

\* \* \* \* \*